United States Patent Office 2,879,134
Patented Mar. 24, 1959

2,879,134

METHOD OF REDUCING A METAL COMPOUND TO A LOWER STATE OF OXIDATION IN THE PRESENCE OF A CUPRIC ACETATE CATALYST

Jack Halpern, Vancouver, British Columbia, Canada, assignor, by mesne assignments, to Canadian Patents and Development Limited, Ottawa, Ontario, Canada, a company No Drawing. Application March 30, 1954
Serial No. 419,926

5 Claims. (Cl. 23—140)

This invention relates to a new and useful catalyst for hydrogenation reactions.

While catalysts are well known and are widely used in hydrogenation reactions, the detailed mechanism by which they function, although closely studied and investigated, is not completely understood. It is generally accepted, however, that the reactants become activated through adsorption of the molecular hydrogen on the catalyst surface and that the catalyzed reaction is heterogeneous, involving adsorbed molecules. The generally accepted theory of hydrogenation catalysis is concerned primarily with this adsorption process and relates only to solid catalysts. Thus, with few exceptions catalysts for hydrogenation reactions are solids such as metals or metallic oxides.

There are important disadvantages in the use of solid catalysts in hydrogenation reactions. For example, metallic nickel and platinum, which are widely used as catalysts, are difficult to prepare in a form in which they combine maximum surface area with maximum catalytic activity and, as a result, are expensive. A further disadvantage is that the reducing reaction occurs only on the catalyst surface and the rate of reaction is slower than for comparable homogeneous reactions. Also, it is known that solid catalysts are very sensitive to trace amounts of impurities such as arsenic and sulphur which serve to poison the catalyst and destroy its catalytic activity. The sensitivity to trace amounts of impurities limits the useful life of the catalyst, or may preclude its use altogether in a system in which such poisons are present or, alternatively, makes necessary additional treatment of the reactants to remove the final traces of the impurities.

A further important disadvantage of solid catalysts is that in the hydrogen reduction of metal values from solutions, particularly from aqueous solutions, there may be some tendency of the catalyst to dissolve in the solution or precipitate as a contaminant with the desired product metal values.

There is, therefore, an important widespread demand for suitable catalysts for use in hydrogenation reactions which avoid the disadvantages attendant with the use of conventional solid catalysts. As a result, workers in the field of hydrogenation reactions have investigated the possibilities of the use of dissolved catalysts as substitutes for known solid catalysts. The interest in such investigations is due, probably, in part to the theoretical implications concerned with the homogeneous activation of molecular hydrogen and, in part, to the realization that many of the difficulties presently encountered in hydrogenation processes are due to the use of solid catalysts and these difficulties could be overcome if dissolved catalysts could be employed.

As a result of detailed investigations into the possible use of dissolved catalysts, two such catalysts have been suggested. Calvin, 34 Faraday Society Transactions 1181 (1938); 61 Journal American Chemical Society, 2230 (1939), found that cuprous acetate in quinoline solution catalyzed the homogeneous hydrogenation of compounds such as quinone. Wender, Orchin and others, reported by Orchin in "Advances in Catalysis," volume 5, Academic Press Inc., 1953, pages 385–415, and in earlier papers, found that dicobalt octacarbonyl, $Co_2(CO)_8$, or possibly the corresponding hydrocarbonyl, $HCo(CO)_4$, is effective as a homogeneous hydrogenation catalyst in a number of hydrogenation reactions.

The use of cuprous acetate as a hydrogenation catalyst appears to be restricted to a small group of organic solvents, such as quinoline, and is limited to a small group of reactions as it is not stable in the presence of easily reduced compounds. Also, cuprous acetate as such does not exist in aqueous solutions as it hydrolyzes completely and precipitates from the solution. The use of dicobalt octacarbonyl has the disadvantage that it is relatively unstable at reaction temperatures above about 100° C., thereby necessitating the employment of partial pressures of hydrogen and carbon monoxide of the order of 1000 pounds per square inch or higher to prevent dissociation of the catalyst. The generation and maintenance of such high pressures present operating problems and may result in undesirable side reactions.

I have found that cupric acetate has the property of activating molecular hydrogen to the extent that it reacts readily with other hydrogen reducible compounds in the solution. The activation process, which involves the formation of a complex of cupric acetate and hydrogen, occurs homogeneously in the solution as the reducing reaction proceeds and no solid catalyst is required.

I have found further that cupric acetate dissolved in the solution can be employed with advantage as a homogeneous hydrogenation catalyst in a wide range of aqueous solutions. In fact, it is found in hydrogenation reactions that cupric acetate can function as a true catalyst in that it accelerates the rate of the chemical reaction without influencing the equilibrium and without undergoing permanent chemical change.

The discovery of the function of cupric acetate as a homogeneous catalyst in hydrogenation reactions is, of course, the result of detailed investigations over a relatively long period of time, and is not derived from hypothetical considerations. From an experimental point of view, the reduction of cupric acetate in aqueous solution would appear to involve the reaction represented by the following equation:

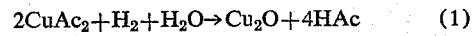

$$2CuAc_2 + H_2 + H_2O \rightarrow Cu_2O + 4HAc \quad (1)$$

When hydrogen is present in excess, the reduction proceeds to completion with all the copper values being precipitated as $Cu_2O$.

From the results of investigations over a relatively wide range of temperatures and of partial pressures of hydrogen, it was established that the reaction is homogeneous and the rate of the reaction is independent of other factors such as the surface of the reaction vessel and of the cuprous oxide product.

The kinetic results indicate that the rate-determining step of the reaction is a homogeneous bimolecular process involving the formation of a complex between a molecule of hydrogen and a molecule of cupric acetate. The hydrogen apparently becomes activated in this step, so that subsequent hydrogenation of the cupric acetate, or of other reducible substrates in the solution, is rapid. The following sequence of steps appears to be involved:

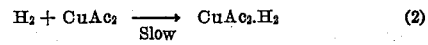

$$H_2 + CuAc_2 \xrightarrow{\text{Slow}} CuAc_2.H_2 \quad (2)$$

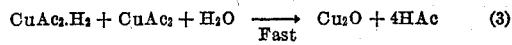

$$CuAc_2.H_2 + CuAc_2 + H_2O \xrightarrow{\text{Fast}} Cu_2O + 4HAc \quad (3)$$

When a reducible substrate such as $Cr_2O_7^=$ is present in an aqueous solution with cupric acetate, the dichromate salt is preferentially reduced in accordance with the reactions expressed by the following equations:

$$3H_2 + 3CuAc_2 \xrightarrow{Slow} 3CuAc_2.H_2 \quad (4)$$

$$3CuAc_2.H_2 + Cr_2O_7^= + 8H^+ \xrightarrow{Fast} 2Cr^{+++} + 7H_2O + 3CuAc_2 \quad (5)$$

Under the reducing conditions, cupric acetate is regenerated and functions as a true homogeneous catalyst. There is no reduction of cupric acetate to cuprous oxide until all the dichromate has been reduced to a chromic salt.

The following examples illustrate the use of cupric acetate as a homogeneous catalyst in hydrogenation reactions. In each instance, the solution contained an excess of acetate ions so that most, if not all, of the cupric acetate was in the form of undissociated cupric acetate molecules.

*Example 1*

An aqueous solution containing 0.01 m./l. (mols per litre) of sodium dichromate, $Na_2Cr_2O_7$, and about 0.5 m./l. acetic acid was heated in a closed vessel at a temperature of about 100° C. and under a partial pressure of hydrogen of about 13.6 atmospheres, about 300 pounds per square inch, for about one hour. The solution was agitated and hydrogen was fed into the vessel during the course of the treatment. No reaction occurred during the course of the treatment and no chromic salt was produced.

*Example 1A*

About 0.15 m./l. of cupric acetate was added to the aqueous solution and the treatment was repeated under the conditions described above. At the end of one hour, all the sodium dichromate had been reduced to a chromic salt, evidently in accordance with the following theoretical reactions:

(a)   Slow—$3CuAc_2 + 3H_2 \rightarrow 3CuAc_2.H_2$
(b)   Fast—$3CuAc_2.H_2 + Cr_2O_7^=$
$$+ 8H^+ \rightarrow 2Cr^{+++} + 7H_2O + 3CuAc_2$$

These theoretical reactions can be expressed by the following representative equation:

$$Na_2Cr_2O_7 + 2HAc + 3CuAc_2.3H_2 \rightarrow$$
$$2Cr(OH)_3 + H_2O + 2NaAc + 3CuAc_2$$

No cupric acetate was consumed during the reduction of the dichromate. Thus, the cupric acetate functioned as a true catalyst. The rate of the overall reaction is determined by reaction (a) of the sequence, during which the hydrogen is activated, evidently through the formation of a complex with cupric acetate.

*Example 2*

Cupric acetate was employed to catalyze its own reduction to cuprous oxide. This occurs when no other reducible substance is present in the solution.

An aqueous solution containing 0.3 m./l. of cupric acetate and 0.5 m./l. acetic acid was heated to and maintained at a temperature of about 125° C. under a partial pressure of hydrogen of about 13.6 atmospheres, about 300 pounds per square inch, for about an hour. During this period about 99% of the copper reduced to and precipitated from the solution as a very pure crystalline cuprous oxide product. This method is ideally adapted for the production of chemically pure cuprous oxide from copper bearing starting material.

*Example 3*

An aqueous solution containing about 2.5 grams per litre sodium metavanadate, $NaVO_3$, and about 100 grams per litre acetic acid was heated to and maintained at a partial pressure of hydrogen of about 200 pounds per square inch for about four hours. The solution was agitated and a stream of hydrogen was fed into the reaction vessel during this period. No reaction occurred and there was no reduction of the sodium metavanadate.

*Example 3A*

About 3 grams per litre cupric acetate was added to the sodium metavanadate and the reducing reaction was repeated for a four hour period under the conditions described in Example 3 above. At the end of the four hour reaction period the pentavalent vanadium had reduced completely to the tetravalent state according to the reaction expressed by the following theoretical equation:

$$2V(OH)_4^+ + H_2 + 2H^+ \rightarrow 2VO^{++} + 6H_2O$$

This theoretical reaction can be expressed by the following representative equation:

$$CuAc_2 + 2NaVO_3 + H_2 + 6HAc$$
$$\rightarrow 2VOAc_2 + 3NaAc + 4H_2O + CuAc_2$$

The cupric acetate catalyst of the present invention possesses many important advantages. It can be prepared inexpensively such as by treating cuprous oxide with acetic acid according to conventional practice, or by any other known method.

The cupric acetate catalyst can be added to the solution as such or it can be formed in the solution such as by adding to the solution acetic acid or a salt thereof such as sodium acetate and a salt of copper such as copper sulphate or copper oxide.

It can be used in a wide variety of reactions, involving the hydrogenation of both organic and inorganic compounds. In general, it is effective in the reduction of any element or compound, which has a greater tendency, thermodynamically, to react with hydrogen than cupric acetate itself and which is soluble in the solution. It can be employed in recovering values of these metals from leach solutions, either as product metals or in the form of lower oxides, where reduction and precipitation by conventional methods is difficult or involves the use of expensive catalysts and/or high pressure equipment. A particular advantage of this cupric acetate catalyst is that it can be used to effect hydrogenation reactions in acid solutions where catalysts such as nickel cannot be used as they are soluble in the solution and at present it is necessary to use more expensive catalysts such as platinum.

The rate of reactions catalyzed by cupric acetate is normally proportional to the concentration of cupric acetate and to the partial pressure of hydrogen. For example, concentrations as low as 0.1 mol per litre cupric acetate will serve to catalyze the hydrogenation to the extent that the reaction will proceed at a faster rate than if no cupric acetate were present. The rate of the reaction can be increased by increasing the concentration of cupric acetate to a maximum determined by the solubility of cupric acetate in the solution. The rate of the reaction also increases by approximately a factor of two for every rise of 10° C. in temperature. The rate can thus be conveniently controlled by adjusting any of these variables. As the reactions are homogeneous and insensitive to the effect of poisons, much better reproducibility and control can be achieved than is possible by using solid catalysts.

What I desire to protect by Letters Patent of the United States is:

1. In a method of reducing a metal compound selected from the group consisting of chromium and vanadium to a lower state of oxidation in an inorganic aqueous solution by reacting the metal compound with hydrogen gas in a reaction vessel maintained at an elevated temperature and under a positive partial pressure of hydrogen, the improvement which comprises conducting the reducing reaction in the presence of a finite amount of cupric acetate dissolved in the solution and continuing the reducing reaction for a period of time sufficient to reduce the metal compound to a lower state of oxidation.

2. The method according to claim 1 characterized in that the cupric acetate is dissolved in the solution in at least about 0.1 mol per litre.

3. The method according to claim 1 characterized in that the metal compound is a metal oxide and the reducing reaction is continued until the metal oxide is reduced to a lower state of oxidation.

4. The method according to claim 1 characterized in that the metal compound is in the form of a dichromate compound which is reduced, during the reducing reaction, to a chromic compound.

5. The method according to claim 1 characterized in that the metal compound is in the form of a vanadate and the reducing reaction is continued until the vanadate is reduced to a lower state of oxidation.

References Cited in the file of this patent
UNITED STATES PATENTS

| | | |
|---|---|---|
| 1,597,216 | Stokes | Aug. 24, 1926 |
| 2,512,653 | Kapeeki | June 27, 1950 |

OTHER REFERENCES

Ipatiew et al.: "Berichte," vol. 42, pages 2080–2082 (1909).

Babor et al.: "General College Chemistry," 1940, page 300.